United States Patent
Nakao et al.

(10) Patent No.: US 11,899,431 B2
(45) Date of Patent: Feb. 13, 2024

(54) GENERATING DEVICE, SYSTEM, AND PROGRAM FOR CONTROLLING USE BY FACILITY EQUIPMENT OF PURCHASED POWER

(71) Applicant: DAIKIN INDUSTRIES, LTD., Osaka (JP)

(72) Inventors: Takuya Nakao, Osaka (JP); Shuji Furui, Osaka (JP); Yoshihiro Nakagawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/019,343

(22) PCT Filed: Jul. 30, 2021

(86) PCT No.: PCT/JP2021/028358
§ 371 (c)(1),
(2) Date: Feb. 2, 2023

(87) PCT Pub. No.: WO2022/030386
PCT Pub. Date: Feb. 10, 2022

(65) Prior Publication Data
US 2023/0213919 A1 Jul. 6, 2023

(30) Foreign Application Priority Data
Aug. 3, 2020 (JP) ................. 2020-131776

(51) Int. Cl.
G05B 19/418 (2006.01)
G06Q 30/0283 (2023.01)
G06Q 50/06 (2012.01)

(52) U.S. Cl.
CPC ..... G05B 19/4183 (2013.01); G06Q 30/0284 (2013.01); G06Q 50/06 (2013.01); G05B 2219/39407 (2013.01)

(58) Field of Classification Search
CPC ...... G05B 19/4183; G05B 2219/39407; G06Q 30/0284; G06Q 50/00; G06Q 50/06;
(Continued)

(56) References Cited

U.S. PATENT DOCUMENTS 9,316,435 B2 * 4/2016 Allard ................ F25J 3/04836
10,317,924 B2 * 6/2019 Schwarz ................ H02J 3/008
(Continued)

FOREIGN PATENT DOCUMENTS

JP 2003-6289 A 1/2003
JP 2005-6427 A 1/2005
(Continued)

OTHER PUBLICATIONS

International Search Report (PCT/ISA/210), issued in PCT/JP2021/028358, dated Oct. 26, 2021.
(Continued)

*Primary Examiner* — M. N. Von Buhr
(74) *Attorney, Agent, or Firm* — Birch, Stewart, Kolasch & Birch, LLP

(57) ABSTRACT

[Object] To suppress increase in load on a calculator for processing electricity charges, in a case in which an electricity retailer that purchased power of which the price fluctuates sells power on the basis of metered charges in accordance with an amount of power usage of a consumer, by controlling facility equipment of the consumer on the basis of a relation between purchase prices and metered charges of the power.

[Solution] A control device serving as a generating device that generates control information for controlling facility equipment of a consumer that purchases power from an electricity retailer includes an information acquisition unit that acquires purchase price information, which is information relating to a purchase unit price of power that the (Continued)

electricity retailer purchases at a predetermined increment of time and that also acquires metered charge information, which is information relating to a unit price of a metered charge of power that the electricity retailer sells at the predetermined increment of time, and a control information generating unit that generates control information for controlling the facility equipment of the consumer by using the purchase price information and the metered charge information.

7 Claims, 8 Drawing Sheets

(58) Field of Classification Search
CPC .. G06Q 30/0201; G06Q 30/0283; G01D 4/00; G01R 21/00; G01R 21/07; G07F 15/00; G07F 15/003; G07F 15/005; G07F 15/006; H02J 3/00; H02J 3/008; H02J 3/0075; Y02B 70/3225; Y04S 20/222
See application file for complete search history.

(56) References Cited

U.S. PATENT DOCUMENTS

| | | | |
|---|---|---|---|
| 10,339,602 B2* | 7/2019 | Tokunaga | H02J 13/00028 |
| 10,521,867 B2* | 12/2019 | Strelec | G06Q 30/0202 |
| 10,770,899 B2* | 9/2020 | Sheble | H02J 3/14 |
| 2002/0194012 A1 | 12/2002 | Maekawa et al. | |
| 2004/0220869 A1* | 11/2004 | Perera | H02J 3/008 |
| | | | 705/37 |
| 2008/0046387 A1* | 2/2008 | Gopal | H02J 3/008 |
| | | | 705/412 |
| 2011/0204720 A1* | 8/2011 | Ruiz | B60L 53/305 |
| | | | 307/66 |
| 2012/0209443 A1 | 8/2012 | Lee et al. | |
| 2013/0066791 A1* | 3/2013 | Sakamoto | H02J 3/32 |
| | | | 705/307 |
| 2016/0226250 A1* | 8/2016 | Fukubayashi | H02J 3/008 |
| 2017/0159955 A1 | 6/2017 | Kobayashi | |
| 2018/0252417 A1 | 9/2018 | Komatsu et al. | |
| 2022/0048399 A1* | 2/2022 | Nishita | H02J 3/003 |
| 2023/0213230 A1* | 7/2023 | Nakao | F24F 11/48 |
| | | | 700/276 |

FOREIGN PATENT DOCUMENTS

| | | |
|---|---|---|
| JP | 2012-7868 A | 1/2012 |
| JP | 2015-183935 A | 10/2015 |
| JP | 2017-16564 A | 1/2017 |
| JP | 2019-143909 A | 8/2019 |
| JP | 6589227 B1 | 10/2019 |
| JP | 2020-65346 A | 4/2020 |
| WO | WO 2017/090180 A1 | 6/2017 |
| WO | WO 2017/094223 A1 | 6/2017 |

OTHER PUBLICATIONS

Extended European Search Report for European Application No. 21852770.3, dated Dec. 19, 2023.

* cited by examiner

FIG.7

| INTERVAL | 1 | 2 | 3 | 4 | 5 | 6 |
|---|---|---|---|---|---|---|
| METERED CHARGE UNIT PRICE (YEN/kWh) | 18 | 18 | 18 | 20 | 20 | 20 |
| PURCHASE UNIT PRICE (YEN/kWh) | 10 | 14 | 25 | 13 | 15 | 12 |
| CONTROL OBJECT | − | − | ○ | − | − | − |

FIG.8

| INTERVAL | 1 | 2 | 3 | 4 | 5 | 6 |
|---|---|---|---|---|---|---|
| METERED CHARGE UNIT PRICE (YEN/kWh) | 18 | 18 | 18 | 18 | 18 | 18 |
| PURCHASE UNIT PRICE (YEN/kWh) | 10 | 14 | 16 | 13 | 14 | 12 |
| ADJUSTMENT VALUE(kW) | - | - | -5 | +5 | - | - |
| CONTROL OBJECT | - | - | ○ | - | - | - |

GENERATING DEVICE, SYSTEM, AND PROGRAM FOR CONTROLLING USE BY FACILITY EQUIPMENT OF PURCHASED POWER

TECHNICAL FIELD

The present invention relates to a generating device, a system, and a program.

BACKGROUND ART

PTL 1 describes a control device that calculates control information for an air conditioner, calculates an evaluation value regarding a case of operating the air conditioner on the basis of the control information, has a plurality of evaluation values sampled in advance on the basis of control information randomly generated over a predetermined amount of time set such that a distribution of evaluation values following sampling approximate a normal distribution, and also determines whether or not the calculated evaluation values are values within a predetermined range set on the basis of the normal distribution obtained by approximation of the distribution of the plurality of evaluation values sample in advance. In order to maximally achieve an indoor set temperature that is set by a user, while also operating the air conditioner or the like at the least expensive power charges, this control device sets a power restriction value that is an upper limit value of power consumed by the air conditioner or the like. The air conditioner or the like is then controlled using operation restriction schedule information that contains a power restriction value for each predetermined amount of time (e.g., five minutes).

CITATION LIST

Patent Literature

PTL 1: Japanese Patent No. 6589227

SUMMARY OF INVENTION

Technical Problem

There is a form of trading, in which an electricity retailer that purchased power of which a price fluctuates in accordance with time, from a power market or the like for example, sells the power on the basis of metered charges corresponding to amounts of power usage by consumers. Now, if the electricity retailer sells power to consumers in a state in which the metered charges are lower than the purchase price, for example, the revenue of the electricity retailer will suffer. Accordingly, setting the metered charges (selling price) so as to fluctuate in accordance with time so as to correspond to the purchase price that fluctuates in accordance with time is conceivable.

However, calculating metered charges that fluctuate in accordance with time so as to correspond to the purchase price that fluctuates in accordance with time places a great load on a calculator. Further, in this case, determining the electricity charges for consumers creates a need to perform calculation processing of multiplying the metered charges that fluctuation in accordance with time by the power amount consumed by the consumers at that time, for all periods, and for each of all of the consumers, and so forth, placing an extremely high load on the calculator.

It is an object of the present disclosure to suppress increase in load on a calculator for processing electricity charges, in a case in which an electricity retailer that purchased power of which the price fluctuates sells the power on the basis of metered charges in accordance with an amount of power usage by consumers, by controlling facility equipment of the consumers on the basis of a relation between purchase prices of power and metered charges.

Solution to Problem

A generating device according to the present disclosure generates control information for controlling facility equipment of a consumer that purchases power from an electricity retailer. The generating device includes a purchase price information acquisition unit that acquires purchase price information, which is information relating to a purchase unit price of power that the electricity retailer purchases at a predetermined increment of time, a metered charge information acquisition unit that acquires metered charge information, which is information relating to a unit price of a metered charge of power that the electricity retailer sells at the predetermined increment of time, and a control information generating unit that generates control information for controlling the facility equipment of the consumer by using the purchase price information and the metered charge information.

Thus, facility equipment of the consumer can be controlled on the basis of a relation between the purchase unit price of power and the metered charge by the electricity retailer, and accordingly increase in load on a calculator for processing electricity charges can be suppressed.

Now, the control information generating unit may generate the control information for controlling the facility equipment to suppress power usage, in a case in which a relation between the purchase unit price and the metered charge satisfies a predetermined condition.

Thus, control can be performed in which power usage by facility equipment of the consumer is suppressed on the basis of the relation between the purchase unit price of power and the metered charge by the electricity retailer, and accordingly increase in load on the calculator for processing electricity charges can be suppressed.

Also, the control information generating unit may generate the control information for controlling the facility equipment to suppress power usage, in a case in which the purchase unit price is higher than the metered charge, as the predetermined condition.

Thus, control can be performed in which power usage by facility equipment of the consumer is suppressed in a case in which the purchase unit price is higher than the metered charge, and accordingly increase in load on the calculator for processing electricity charges can be suppressed.

Also, the control information generating unit may generate the control information for controlling the facility equipment to suppress power usage, in a case in which a difference between the purchase unit price and the metered charge is smaller than a threshold value set in advance, as the predetermined condition.

Thus, control can be performed in which power usage by facility equipment of the consumer is suppressed in a case in which a difference between the purchase unit price and the metered charge is small, and accordingly increase in load on the calculator for processing electricity charges can be suppressed.

Also, the control information generating unit may generate the control information for controlling the facility equipment to suppress power usage, in a case in which a ratio of the purchase unit price to the metered charge at the predetermined increment of time is greater than a threshold value smaller than 1 that is set in advance, as the predetermined condition.

Thus, control can be performed in which power usage by facility equipment of the consumer is suppressed in a case in which the purchase unit price and the metered charge are prices that are near to each other, and accordingly increase in load on the calculator for processing electricity charges can be suppressed.

Also, the metered charge information acquisition unit may further acquire information representing a fluctuation pattern of one day of the metered charge, as the metered charge information.

Thus, control can be performed in which power usage by facility equipment of the consumer is suppressed on the basis of a fluctuation pattern of one day of the metered charge, and accordingly increase in load on the calculator for processing electricity charges can be suppressed.

Also, a system according to the present disclosure includes a generating device that generates control information for controlling facility equipment of a consumer that purchases power from an electricity retailer, and facility equipment that accepts the control information generated by the generating device and performs action. The generating device includes a purchase price information acquisition unit that acquires purchase price information, which is information relating to a purchase unit price of power that the electricity retailer purchases at a predetermined increment of time, a metered charge information acquisition unit that acquires metered charge information, which is information relating to a unit price of a metered charge of power that the electricity retailer sells, at the predetermined increment of time, and a control information generating unit that generates control information for controlling the facility equipment of the consumer by using the purchase price information and the metered charge information.

Thus, facility equipment of the consumer can be controlled on the basis of a relation between the purchase unit price of power and the metered charge by the electricity retailer, whereby increase in load on a calculator for processing electricity charges can be suppressed.

A program according to the present disclosure causes a computer to function as purchase price information acquisition section that acquires purchase price information, which is information relating to a purchase unit price of power that an electricity retailer purchases at a predetermined increment of time, metered charge information acquisition section that acquires metered charge information, which is information relating to a unit price of a metered charge of power that the electricity retailer sells at the predetermined increment of time, and control information generating section that generates control information for controlling facility equipment of a consumer by using the purchase price information and the metered charge information.

According to the computer in which this program is installed, facility equipment of the consumer can be controlled on the basis of a relation between the purchase unit price of power and the metered charge by the electricity retailer, whereby increase in load on a calculator for processing electricity charges can be suppressed.

BRIEF DESCRIPTION OF DRAWINGS

FIG. 7 is a diagram showing a relation between metered charge prices, purchase prices, and suppression control, according to a first control example.

FIG. 8 is a diagram showing a relation between metered charge prices, purchase prices, power control amount, and suppression control, according to a second control example.

DESCRIPTION OF EMBODIMENTS

An embodiment will be described in detail below with reference to the attached drawings.

<System Configuration>

Figure 1:
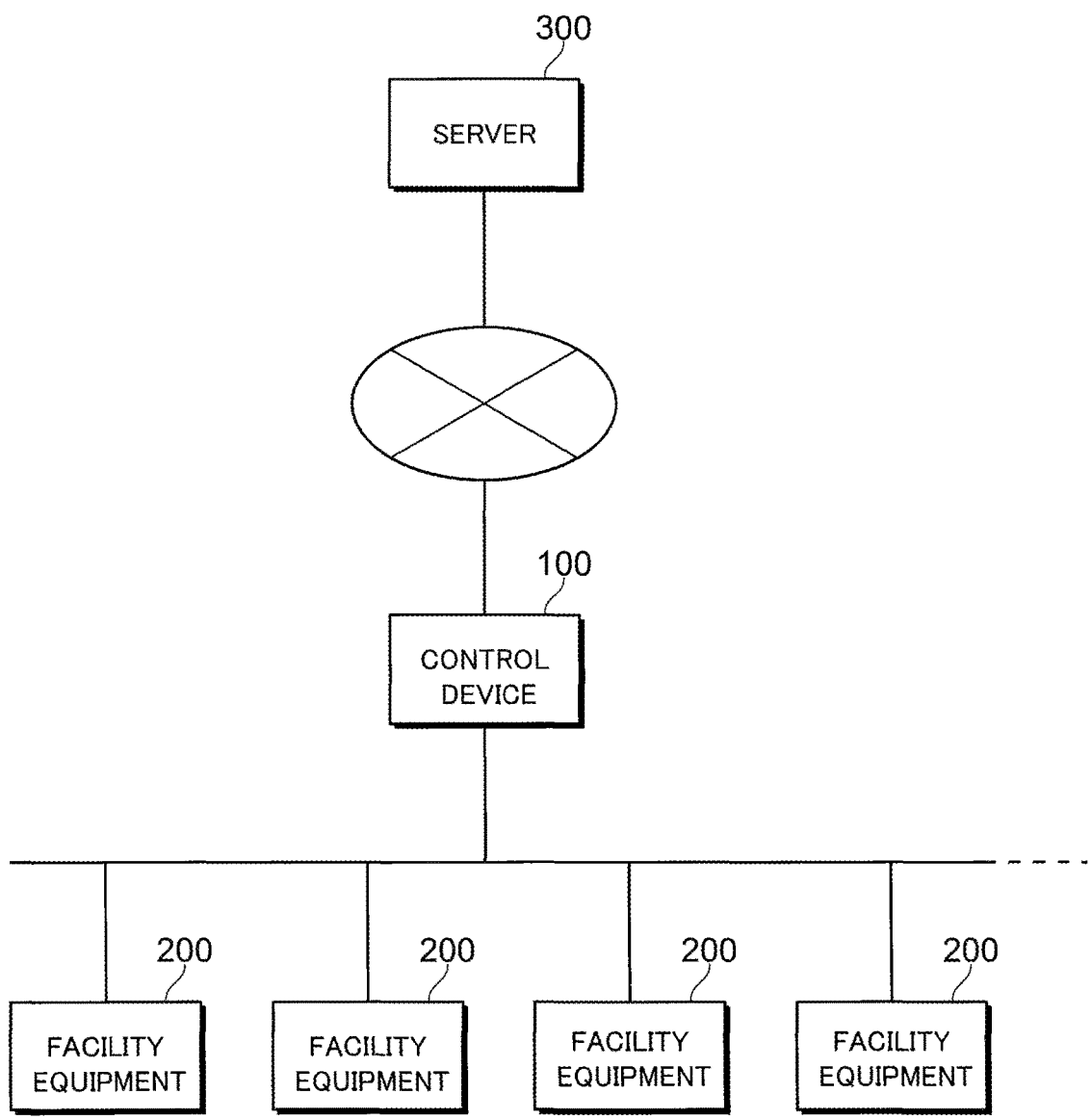
FIG. 1 is a diagram illustrating an overall configuration of a control system for facility equipment, to which the present embodiment is applied.

FIG. 1 is a diagram illustrating an overall configuration of a control system for facility equipment, to which the present embodiment is applied. The control system according to the present embodiment includes a control device 100 and facility equipment 200 that are controlled devices. The control device 100 and the facility equipment 200 are connected via a network. This network may be a LAN (Local Area Network) made up of a dedicated line, or alternatively, a VPN (Virtual Private Network) set up on a WAN (Wide Area Network) or the Internet, or the like, may be used. The facility equipment 200 are facilities and equipment that perform actions using power. The control device 100 controls actions of one or a plurality of sets of facility equipment 200. FIG. 1 illustrates a configuration example of the control device 100 controlling the plurality of sets of facility equipment 200. The facility equipment 200 performs actions using power, and the type thereof is irrelevant, as long as it is a facility or equipment of which actions are controlled by the control device 100. In the following description, description may be made in some cases regarding an example of applying the control system according to the present embodiment to control of air conditioning equipment, as a specific example of the facility equipment 200.

Also, the facility equipment 200 includes control section for controlling the facility equipment 200 in accordance with settings. The control device 100 generates control information for the facility equipment 200 that is an objects of control, and transmits the generated control information to each set of the facility equipment 200. Each set of facility equipment 200 acquires the control information from the control device 100, performs settings of the facility equipment 200 by the control section in the facility equipment 200, following the control information that is acquired, and controls actions thereof.

Also, the control device 100 is connected to a server 300 of an electricity retailer via the network. The electricity retailer is a business that purchases power on the power market, and sells the power to consumers. The server 300 provides the control device 100 with information relating to purchase prices of power (hereinafter referred to as "purchase price information"), and information of sale prices. The Internet, for example, is used as the network connecting the control device 100 and the server 300. Alternatively, a LAN or WAN may be used.

<Relation Between Electricity Charges and Control of Facility Equipment 200>

Electricity charges will be described here. Electricity charges are made up primarily of base fees and power amount charges, and are determined each month. The base fees are calculated on the basis of base fee unit prices and contract demand. The contract demand is the greatest value of the greatest demand power within the past year from the current month. The greatest demand power is the greatest value of average power usage for each interval (demand interval: 30 minutes) in a month. The average power usage is an average value of demand power (power usage) in each interval. Also, power amount charges are calculated on the basis of power amount charge unit prices and amount of power usage per month. In the following description, power amount charge may also be referred to as "metered charge", and power charge amount unit price as "metered charge unit price".

As described above, the contract demand is the greatest value of the greatest demand power within the past year. Accordingly, once the greatest demand power for a certain month (in other words, the average power usage for a certain interval in that month) becomes the contract demand, base fees are charged for one year based on this contract demand, even if a greatest demand power lower than this contract demand continues to be maintained from that month forward. Also, once average power usage in a certain interval exceeds the value of the earlier contract demand, and becomes the greatest demand power for the month in which that interval is included, the average power usage (greatest demand power) of that interval is used for calculating base fees thereafter, as a new contract demand.

Also, there are various forms in settings for power amount charge unit prices, and settings can be made in which power amount charge unit prices fluctuate on the basis of predetermined conditions. For example, there are cases of settings being made in which power amount charge unit prices fluctuate, in accordance with, for example, the part of day within one day, whether a weekday or a holiday, the season, and so forth. Also, power has come to be traded on the market, and there now are forms in which electricity retailers sell power purchased on the market to consumers. In such forms, there are cases in which power amount charge unit prices are set that fluctuate to reflect trading prices of power on the market.

Electricity retailers purchase power on the market in increments of intervals, and sell the power that is purchased, to consumers. Accordingly, the purchase price of power purchased by electricity retailers fluctuate in increments of intervals. Now, in order for electricity retailers to make a profit, the power needs to be sold at a higher price than the purchase price. On the other hand, if the sale price becomes too high, the consumers lose the advantage of purchasing power from the electricity retailers. Accordingly, the sale prices of power are decided taking into consideration a balance between profit of the electricity retailers and profit of the consumers. For example, section such as setting sale prices that follow fluctuation in purchase prices each interval (metered charge unit prices), while maintaining a certain price difference as to purchase prices, are conceivable.

However, calculating metered charge unit prices that fluctuate each interval so as to follow purchase prices that fluctuate each interval places a heavy load on the calculator. In a case in which such settings are made for metered charge unit prices, determining the electricity charges for each consumer necessitates performing calculation processing of multiplying the metered charge unit prices that fluctuate each interval by the power amount consumed by consumers in that interval, for all periods, and for each of all of the consumers. Accordingly, the load on the calculator becomes extremely high.

Setting metered charge unit prices that fluctuate over longer time spans than in increments of intervals, while broadly following purchase prices, is conceivable as section for avoiding this. Note however, in this case, the fluctuation in purchase price in increments of intervals is irregular, and when the difference between purchase prices and metered charge unit prices is set to be small, a situation can occur in which the purchase prices exceed the metered charge unit prices in increments of intervals, resulting in loss to the electricity retailer. According to the present embodiment, in such a case, the control device 100 controls actions of the facility equipment 200 in predetermined increments of time, so as to individually reduce the amount of power consumption, thereby suppressing loss to the electricity retailer from occurring. According to this control, the present embodiment is capable of realizing both suppression of increase in the load on the calculator calculating metered charge unit prices and electricity charges for each consumer, and suppression of a phenomenon occurring in which the purchase prices exceed the metered charge unit prices in increments of intervals, by broadly following purchase prices, rather than in increments of intervals. An example will be described below regarding a case of the control device 100 controlling the facility equipment 200 in increments of time, using intervals as the predetermined increments of time.

Consumers, who enter into contract for power supply, are charged for the electricity charges. Consumers have one or a plurality of sets of facility equipment 200. The control device 100 controls the one or plurality of sets of facility equipment 200. The control device 100 also controls the facility equipment 200 of each consumer, in accordance with electricity charges (base fees and power amount charges) set for each consumer, taking the average power usage per predetermined increment of time and power amount charge unit prices into consideration.

<Configuration of Server 300>

Figure 2:
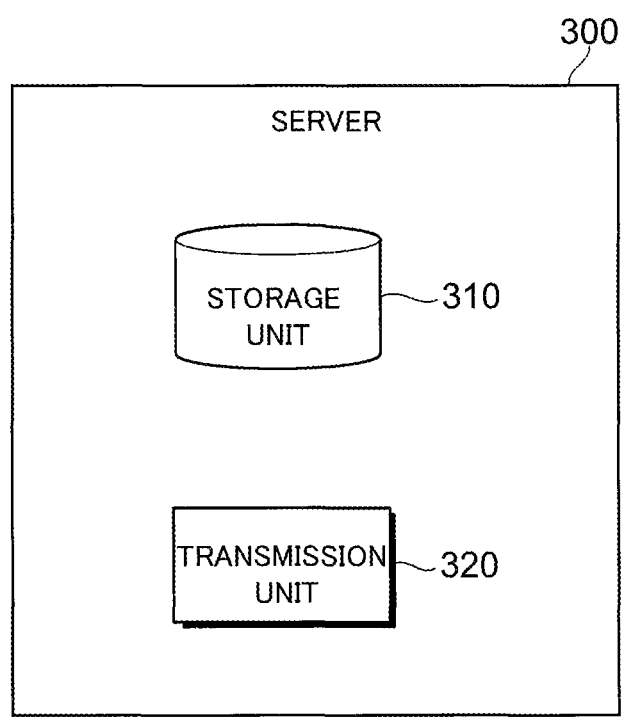
FIG. 2 is a diagram illustrating a configuration of a server.

FIG. 2 is a diagram illustrating a configuration of the server 300. The server 300 is realized as a server configured in a cloud environment of a network (a so-called cloud server), or the like, for example. The server 300 includes a storage unit 310 and a transmission unit 320.

The storage unit 310 stores purchase price information of power that is purchased, and metered charge information, for each consumer to which the electricity retailer sold power. The purchase price information is information relating to the purchase unit price of the power the electricity retailer purchases on the market, in increments of intervals. Note that instead of the purchase price itself of the power, information that is correlated to the purchase price, such as market price or the like, for example, may be used as the purchase price information. The metered charge information is information relating to metered charge unit prices of the power that the electricity retailer sells, in increments of intervals. Each day, one day worth of unit prices for each interval are finalized regarding the metered charge unit prices, prior to control of the facility equipment 200 being started on the current day, which will be described in detail later. Accordingly, the metered charge information may be information representing fluctuation patterns of metered charges of one day, for example.

The transmission unit 320 transmits the purchase price information and the metered charge information stored in the storage unit 310 to the control device 100 that controls the facility equipment 200 of the consumer that purchased power from the electricity retailer. The purchase price information and the metered charge information that is the object of transmission is information of the interval in which the consumer purchased the power. Control contents regarding the facility equipment 200 are finalized before control starts on the current day on which the control is to be performed, which will be described in detail later. Accordingly, the transmission unit 320 transmits the purchase price information and the metered charge information regarding power for each interval to the control device 100, before control information for determining the control contents of the day on which these intervals are included is generated by the control device 100.

<Configuration of Control Device 100>

Figure 3:
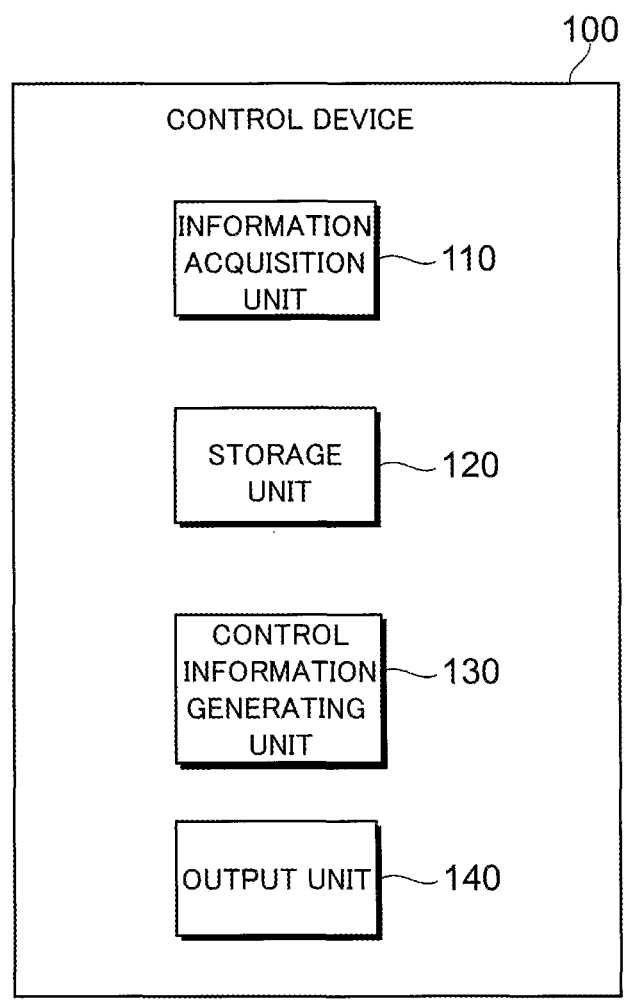
FIG. 3 is a diagram illustrating a configuration of a control device.

FIG. 3 is a diagram illustrating a configuration of the control device 100. The control device 100 includes an information acquisition unit 110, a storage unit 120, a control information generating unit 130, and an output unit 140.

The information acquisition unit 110 acquires various types of information used for generating control information for the facility equipment 200. Information that is acquired by the information acquisition unit 110 includes purchase price information, metered charge information, information relating to power usage of each consumer, and so forth. The information acquisition unit 110 is an example of a purchase price information acquisition unit, and is an example of a metered charge information acquisition unit. The purchase price information and metered charge information are acquired from the server 300. Contract demand, prediction information of power usage, and so forth, for example, are acquired as information relating to power usage. Prediction information of power usage is information of power usage in future intervals, predicted on the basis of history of past use of power by the consumer and so forth. Various types of existing prediction methods may be used for prediction of the power usage. For example, accumulating environment information and running information, and usage history of power, of the facility equipment 200, and predicting power usage from an environment assumed for future intervals and the running state of the facility equipment 200, is conceivable.

Examples of environment information include information of the environment where the facility equipment 200 is installed, such as temperature, humidity, and so forth. Examples of running information include information representing a state of action of the facility equipment 200, such as running rate, continuous running time, and so forth. Additionally, various types of information that conceivably would affect running of the facility equipment 200, such as the part of day of running, difference between running on weekdays and running on holidays, and so forth, can be used. The environment information and running information are acquired from sensors and so forth installed at the location where the facility equipment 200 is installed, or installed within the facility equipment 200, depending on the information that is to be acquired. Also, part of the running information is acquired from the facility equipment 200 itself. Information of the part of day of the facility equipment 200 running, and days of running, may be input by the consumer or a manager of the facility equipment 200, or may be acquired from an external server that provides date-and-time information. Different environment information and running information may be acquired as information to be used for prediction of power usage, in accordance with the type, scale, and so forth, of the facility equipment 200 that is the object of control. Various types of information are acquired via a network, using a network interface that is omitted from illustration, for example.

The storage unit 120 stores various types of information acquired by the information acquisition unit 110. The stored information is used for the control information generating unit 130 to generate control information. The storage unit 120 also stores the control information generated by the control information generating unit 130.

The control information generating unit 130 generates control information for controlling the facility equipment 200, on the basis of the information acquired by the information acquisition unit 110. In the present embodiment, the control information generating unit 130 generates control information for performing control directed at reducing power usage of the facility equipment 200, on the basis of a relation between purchase price information and metered charge unit prices (power amount charge unit prices) which are the sale prices to consumers. Specific contents of control determined by the control information are varied in accordance with the type of the facility equipment 200. For example, in a case in which the facility equipment 200 is air conditioning equipment, examples thereof include resetting the set temperature for cooling or heating in an interval to be controlled such that the power usage of the facility equipment 200 is reduced, and so forth. Also, the control information generating unit 130 may generate control information based on other directivities, in addition to control information directed at reducing power usage. For example, control information directed at comfort of the user of the facility equipment 200 may be generated. The control information generated by the control information generating unit 130 is saved in the storage unit 120, and is sent to the facility equipment 200 that is the object of control at a predetermined timing before the interval in which the control based on the control information is to be performed (in other words, the interval that is the object of control by the control information) arrives.

The output unit 140 reads control information generated by the control information generating unit 130 out from the storage unit 120 at a predetermined timing. The control information that is read out is then output to the facility equipment 200 that is the object of control by each piece of control information via a network, using a network interface that is omitted from illustration.

Figure 4:
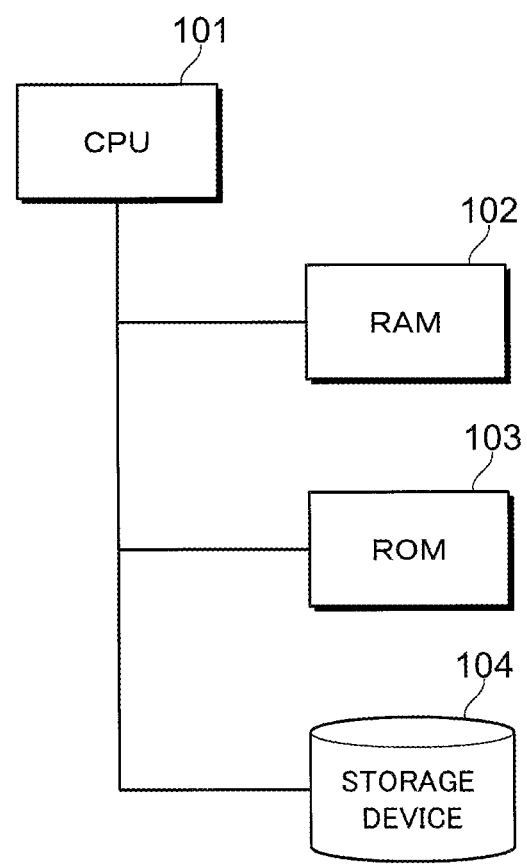
FIG. 4 is a diagram illustrating a hardware configuration example of the control device.

FIG. 4 is a diagram illustrating a hardware configuration example of the control device 100. The control device 100 is realized by a computer, for example. The computer that realizes the control device 100 includes a CPU (Central Processing Unit) 101 that is computing section, RAM (Random Access Memory) 102 and ROM (Read Only Memory) 103 that are storage section, and a storage device 104. The RAM 102 is a main memory device (main memory), and is used as work memory for the CPU 101 to perform computation processing. The ROM 103 holds programs, and data of setting values and so forth prepared in advance. The CPU 101 can read programs and data directly in from the ROM 103 and execute processing thereof. The storage device 104 is saving section for programs and data. Programs are stored in the storage device 104, and the CPU 101 reads the programs stored in the storage device 104 into the main storage device and executes the programs. The storage device 104 also stores and saves results of processing by the CPU 101. Also, the storage device 104 stores a learning model from a reinforcement learning, which is used for selecting a warehouse environment. A magnetic disk device, SSD (Solid State Drive), or the like, for example, is used as the storage device 104.

In a case in which the control device 100 is realized by the computer illustrated in FIG. 4, the functions of the information acquisition unit 110, the control information generating unit 130, and the output unit 140 described with reference to FIG. 3 are realized by the CPU 101 executing programs, for example. The storage unit 120 is realized by the RAM 102 and the storage device 104, for example. Note that the configuration example illustrated in FIG. 4 is only an example of a case of realizing the control device 100 by a computer.

<Configuration of Facility Equipment 200>

Figure 5:
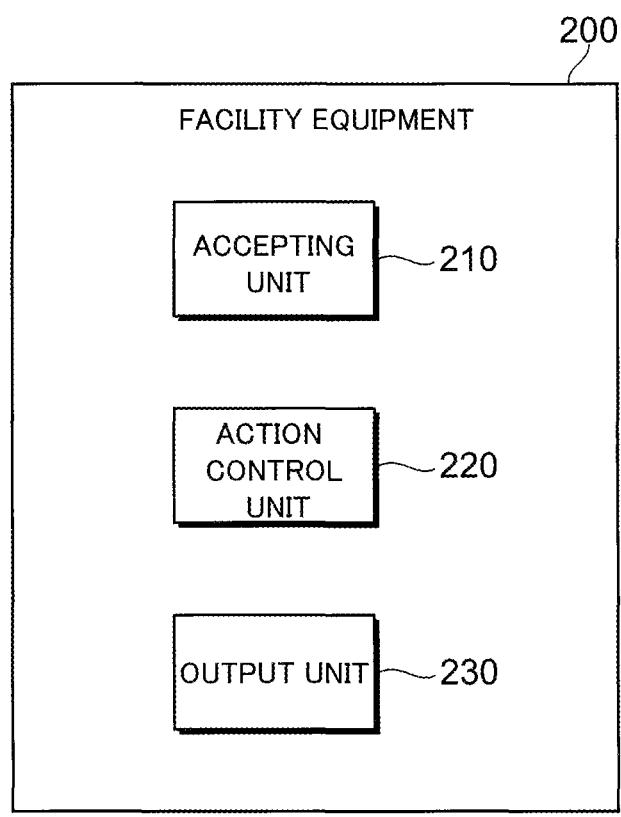
FIG. 5 is a diagram illustrating a configuration of the facility equipment.

FIG. 5 is a diagram illustrating a configuration of the facility equipment 200. The facility equipment 200 includes an accepting unit 210, an action control unit 220, and an output unit 230. Note that the facility equipment 200 has mechanisms and devices for performing actions to realize the functions of the facility equipment 200, in accordance with the type thereof. For example, in a case in which the facility equipment 200 is air conditioning equipment, the facility equipment 200 includes an indoor unit, an outdoor unit, and so forth. Also, in a case in which the facility equipment 200 is lighting facilities, the facility equipment 200 includes lighting fixtures, control switches, and so forth. The types and forms of such mechanisms and so forth are varied in accordance with the type of the facility equipment 200, and accordingly are not illustrated here.

The accepting unit 210 accepts control information output from the control device 100 via a network, using a network interface that is omitted from illustration.

The action control unit 220 controls actions of the mechanisms and devices included in the facility equipment 200, on the basis of the control information accepted by the accepting unit 210. Specifically, in a case in which the facility equipment 200 is air conditioning equipment, for example, the accepting unit 210 accepts information identifying the set temperature as the control information, and the action control unit 220 controls the actions of the indoor unit and the outdoor unit, so as to achieve a set temperature that is accepted. Although an example of control relating to temperature settings is given here, control based on control information from the action control unit 220 can be applied to other various types of control relating to gas that is controllable by air conditioning equipment (e.g., control of humidity, gas components, and so forth). The action control unit 220 in various types of facility equipment 200 other than air conditioning equipment also executes control in accordance with the type of the facility equipment 200, following control information accepted from the control device 100.

The output unit 230 outputs information relating to the state of action of the facility equipment 200 to the control device 100 via a network, using a network interface that is omitted from illustration.

The accepting unit 210, the action control unit 220, and the output unit 230 are realized by a computer, for example. The computer that realizes the action control unit 220 may have the configuration described with reference to FIG. 4. In this case, the functions of the accepting unit 210, the action control unit 220, and the output unit 230 are realized by the CPU 101 illustrated in FIG. 4 executing programs, for example. Also, the functions of the accepting unit 210, the action control unit 220, and the output unit 230 may be realized by dedicated hardware. For example, this is realized by an ASIC (Application Specific Integrated Circuit), a FPGA (Field-Programmable Gate Array), or some other circuit. Further, the accepting unit 210, the action control unit 220, and the output unit 230 may be implemented by a combination of functions realized by the CPU 101 executing programs (software) and function realized by dedicated hardware.

<Relation Between Power Markets and Control Contents of Facility Equipment 200>

In the present embodiment, the facility equipment 200 is controlled such that power usage is reduced, on the basis of purchase price information based on power trading by electricity retailers, and metered charge information. Electricity retailers purchase power on markets in increments of intervals, and determine metered charge unit prices on the basis of prices of purchasing, which are stored in the storage unit 310 of the server 300. Accordingly, the contents of control of the facility equipment 200 (contents of information generated by the control device 100) are determined in accordance with the timings at which the power markets are open.

Figure 6:
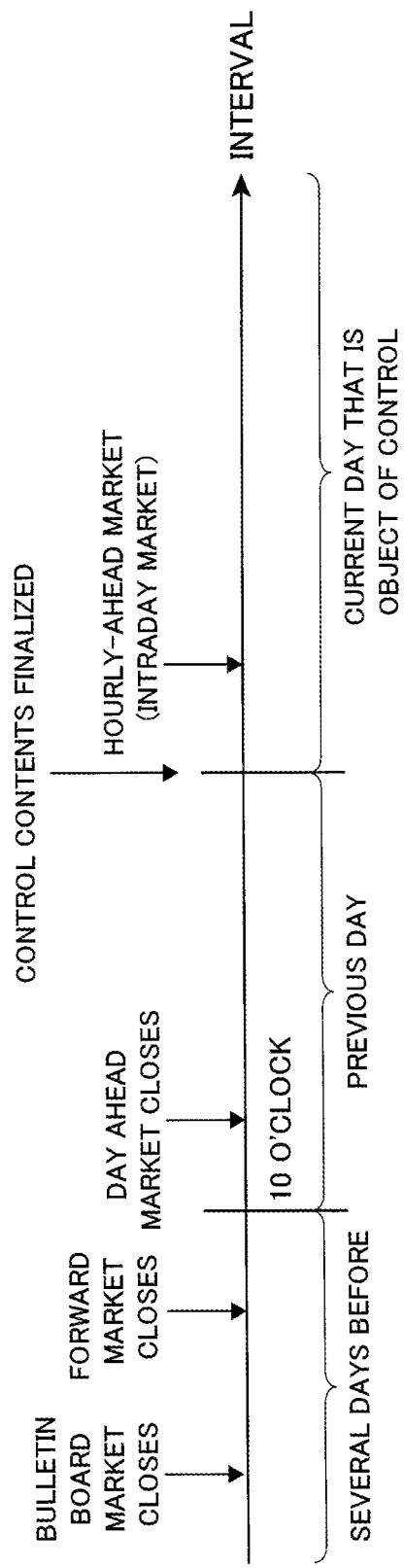
FIG. 6 is a diagram showing a relation between power markets and timings at which control contents of facility equipment are finalized.

FIG. 6 is a diagram showing a relation between power markets and timings at which control contents of the facility equipment 200 are finalized. There are four types of markets in the power market in accordance with the trading timings, which are forward market, bulletin board market, day ahead market, (spot market), and hourly-ahead market (intraday market). Power that is used in a day in which an interval that is the object of control according to the present embodiment (object interval) is included (current day) is traded on these markets. The forward market and the bulletin board market close several days before the current day, and the trading prices are finalized. The day ahead market closes at 10 o'clock AM on the previous day from the day that is the object of control, and the trading prices are finalized. On the hourly-ahead market, trading is conducted up to one hour before the object interval of the current day. This hourly-ahead market is a market that is primarily used for adjusting power generation and demand. Accordingly, in the present embodiment, the control contents of the facility equipment 200 at each interval of the current day are finalized prior to starting control of the facility equipment 200 on the current day, on the basis of trading results on the forward market, the bulletin board market, and the day ahead market, (spot market), as a basic rule.

Note that here, control contents of the facility equipment 200 are finalized on the basis of trading prices on markets other than the hourly-ahead market. Conversely, in a case in which it is certain that power can be procured at more advantageous unit price conditions on the hourly-ahead market following finalization of the control contents, power may be purchased on the hourly-ahead market, and the control contents of the facility equipment 200 may be changed on the basis of the trading price thereof.

<Control Method of Facility Equipment 200>

Next, a control method of the facility equipment 200 will be described. As described above, the control system according to the preset embodiment performs control to reduce the power usage of the facility equipment 200, on the basis of purchase prices of power by electricity retailers, and metered charges (hereinafter referred to as "suppression control"). Specifically, in a case in which the purchase unit price is higher than the metered charge unit price in a certain interval, suppression control is performed (first control example). Also, in a case in which the purchase unit price is lower than the metered charge unit price, and the difference therebetween is smaller than a predetermined threshold value, suppression control is performed (second control example). Each of these cases will be described below by way of specific examples.

Note that the consumer is charged for electricity charges, and accordingly in a case in which the consumer has a plurality of sets of facility equipment 200, the control contents are distributed across the sets of facility equipment 200 in order to realize the above suppression control by the entirety of sets of facility equipment 200. Thus, there can be cases in which one set of facility equipment 200 that the consumer has is subjected to control, for example, while another set of facility equipment 200 is not subjected to control. However, for the sake of simplicity, description will be made in the following examples that one consumer has only one set of facility equipment 200, and that the above-described suppression control is performed with respect to each set of facility equipment 200. Accordingly, in the following examples, the control for reducing power usage of the consumer is suppression control regarding the one set of facility equipment 200 owned by that consumer.

(First Control Example) Control in Case of Purchase Unit Price Higher than Metered Charge Unit Price In a case in which the purchase price of power exceeds the metered charge, the electricity retailer suffers loss by this sale of power. In such a case, the control system according to the present embodiment performs suppression control in the relevant interval to reduce the loss.

FIG. 7 is a diagram showing a relation among metered charge unit prices, purchase unit prices, and suppression control, according to the first control example. FIG. 7 shows values of metered charge unit prices and purchase unit prices, and information indicating whether or not an object of suppression control (written as "control object" in the drawing), with respect to continuous intervals 1 to 6. Purchase unit prices are purchase prices of power in each interval. In the example shown in FIG. 7, the set values for the metered charge unit prices are 18 Yen/kWh for intervals 1 to 3, and 20 Yen/kWh for intervals 4 to 6. The purchase unit prices are 10 Yen/kWh in interval 1, 14 Yen/kWh in interval 2, 25 Yen/kWh in interval 3, 13 Yen/kWh in interval 4, 15 Yen/kWh in interval 5, and 12 Yen/kWh in interval 6.

Comparing the metered charge unit prices and the purchase unit prices at each interval, the metered charge unit prices are higher than the purchase unit prices in intervals 1, 2, and 4 to 6, but the purchase unit price is higher than the metered charge unit price in interval 3. Accordingly, the control system sets interval 3 as the object of suppression control. In FIG. 7, information indicating performing suppression control (a circle mark "o" in the drawing) is recorded in the control object item for interval 3.

(Second Control Example) Control in Case of Purchase Unit Price Lower than Metered Charge Unit Price, and Difference Thereof Smaller than Predetermined Threshold Value Even in a case in which the purchase unit price is lower than the metered charge unit price, suppression control may be performed in a case in which the relation between the purchase unit price and the metered charge unit price satisfies a predetermined condition. For example, in a case in which the difference between the purchase unit price and the metered charge unit price is small, the profit that the electricity retailer gains by selling the power is also small. Accordingly, performing suppression control under the condition that the difference between the purchase unit price and the metered charge unit price is smaller than a predetermined threshold value is conceivable. In this case, adjustment control, which will be described later, is performed in conjunction therewith, not just suppression control alone.

The control contents of this suppression control that reduces the power usage of the facility equipment 200 normally is control that lowers the functions of the facility equipment 200. Such control reduces the comfort or convenience of the user of the facility equipment 200, depending on the type of the facility equipment 200. Accordingly, when suppression control is performed in a certain interval, there are cases in which adjustment control is performed in the interval next after, to recover the comfort or convenience of the user. An example of this is in a case in which the facility equipment 200 is air conditioning equipment, following control for weakening the strength of cooling or heating in a certain interval being performed as suppression control, control for strengthening the strength of cooling or heating being performed in the interval next after in order to recover the comfort lost by weakening the strength of cooling or heating. This adjustment control is control for recovering the comfort or convenience of the user that is reduced due to the suppression control for reducing the power usage of the facility equipment 200, and accordingly is control that increases the power usage of the facility equipment 200, in contrast to suppression control. There can be various types of forms regarding how much to increase the power usage in the adjustment control, but assumption will be made here that this increases the power usage by the same amount as the power usage reduced by the suppression control.

Note that the suppression control in this case aims not to suppress loss of the electricity retailer, but to increase profit. Accordingly, in a case in which the difference between the purchase unit price and the metered charge unit price in the interval in which adjustment control is performed is greater than the difference between the purchase unit price and the metered charge unit price in the interval in which suppression control is performed, the suppression control and adjustment control may be performed.

FIG. 8 is a diagram showing a relation between metered charge unit prices, purchase unit prices, power suppression amount, and suppression control, according to the second control example. FIG. 8 shows values of metered charge unit prices and purchase unit prices, control amount (adjustment value) of power usage in accordance with suppression control and adjustment control, and information indicating whether or not an object of suppression control (control object), with respect to continuous intervals 1 to 6. Control amount is an amount of decrease or increase in power usage in the suppression control and adjustment control. In the example shown in FIG. 8, the set value for the metered charge unit prices is 18 Yen/kWh for all intervals 1 to 6. The purchase unit prices are 10 Yen/kWh in interval 1, 14 Yen/kWh in interval 2, 16 Yen/kWh in interval 3, 13 Yen/kWh in interval 4, 14 Yen/kWh in interval 5, and 12 Yen/kWh in interval 6. Also, the threshold value for the difference between the purchase unit price and the metered charge unit price, for determining whether or not to perform suppression control in a certain interval, is 4 Yen/kWh (threshold value).

Focusing on interval 3 here, the purchase unit price is 16 Yen/kWh and the metered charge unit price is 18 Yen/kWh, and accordingly the difference therebetween is 2 Yen/kWh, which is smaller than the threshold value. Also, focusing on interval 4 that is the interval next after interval 3, the purchase unit price is 13 Yen/kWh and the metered charge unit price is 18 Yen/kWh, and accordingly the difference therebetween is 5 Yen/kWh, which is greater than the difference between the purchase unit price and the metered charge unit price in interval 3. Accordingly, the profit of the electricity retailer increases by performing suppression control and adjustment control as compared to a case of performing neither control. In the example in the drawing, the control amount (adjustment value) of power usage in the suppression control and adjustment control is 5 kW, with 5 kW being subtracted from the power usage in interval 3 (−5 kW), and the power usage in interval 4 being increased by 5 kW (+5 kW). Also, in FIG. 8, information indicating performing suppression control (a circle mark "o" in the drawing) is recorded in the control object item for interval 3.

Note that while suppression control is performed under the condition that the difference between the purchase unit price and the metered charge unit price is smaller than a predetermined threshold value in the second control example above, whether or not to perform suppression control may be decided on the basis of a ratio between the purchase unit price and the metered charge unit price, instead of the difference. As the ratio of the purchase unit price to the metered charge unit price approaches 1, the values of both unit prices near each other, and accordingly the profit that the electricity retailer gains by selling the power is small. Accordingly, suppression control may be performed under a condition that the ratio of the purchase unit price to the metered charge unit price is smaller than 1 and greater than a predetermined threshold value. In this case as well, suppression control is not performed alone, but is performed in conjunction with adjustment control.

While an embodiment is described above, the technical scope of the present disclosure is not limited to the above embodiment. For example, although description is made in the above embodiment that the control device 100 controls the facility equipment 200 in increments of intervals, control may be performed by time different from intervals (e.g., time shorter than intervals). Also, although adjustment control is described as being performed in intervals immediately following intervals that are the object of suppression control in the above embodiment, this is not limited to immediately following, and a later interval after the interval that is the object of suppression control may be the object of adjustment control. Moreover, various modifications and substitutions of configuration that do not depart from the scope of the technical spirit of the present disclosure are encompassed by the present disclosure.

Now, the embodiment described above can be understood as follows. A generating device according to the present disclosure is a control device 100 serving as a generating device that generates control information for controlling facility equipment 200 of a consumer that purchases power from an electricity retailer. The control device 100 includes an information acquisition unit 110 that acquires purchase price information, which is information relating to a purchase unit price of power that the electricity retailer purchases at a predetermined increment of time and that also acquires metered charge information, which is information relating to a unit price of a metered charge of power that the electricity retailer sells at the predetermined increment of time, and a control information generating unit 130 that generates control information for controlling the facility equipment 200 of the consumer by using the purchase price information and the metered charge information.

Thus, the facility equipment 200 of the consumer can be controlled on the basis of a relation between the purchase unit price of power by the electricity retailer and the metered charge, and accordingly increase in load on a calculator for processing electricity charges can be suppressed.

Now, the control information generating unit 130 may generate the control information for controlling the facility equipment 200 to suppress power usage, in a case in which a relation between the purchase unit price and the metered charge satisfies a predetermined condition.

Thus, control can be performed in which power usage of the facility equipment 200 of the consumer is suppressed on the basis of the relation between the purchase unit price of power by the electricity retailer and the metered charge, and accordingly increase in load on the calculator for processing electricity charges can be suppressed.

Also, the control information generating unit 130 may generate the control information for controlling the facility equipment 200 to suppress power usage, in a case in which the purchase unit price is higher than the metered charge, as the predetermined condition.

Thus, control can be performed in which power usage of the facility equipment 200 of the consumer is suppressed in a case in which the purchase unit price is higher than the metered charge, and accordingly increase in load on the calculator for processing electricity charges can be suppressed.

Also, the control information generating unit 130 may generate the control information for controlling the facility equipment 200 to suppress power usage, in a case in which a difference between the purchase unit price and the metered charge is smaller than a threshold value set in advance, as the predetermined condition.

Thus, control can be performed in which power usage of the facility equipment 200 of the consumer is suppressed in a case in which a difference between the purchase unit price and the metered charge is small, and accordingly increase in load on the calculator for processing electricity charges can be suppressed.

Also, the control information generating unit 130 may generate the control information for controlling the facility equipment 200 to suppress power usage, in a case in which a ratio of the purchase unit price to the metered charge at the predetermined increment of time is greater than a threshold value smaller than 1 that is set in advance, as the predetermined condition.

Thus, control can be performed in which power usage of the facility equipment 200 of the consumer is suppressed in a case in which the purchase unit price and the metered charge are prices that are near to each other, and accordingly increase in load on the calculator for processing electricity charges can be suppressed.

Also, the information acquisition unit 110 may further acquire information representing a fluctuation pattern of one day of the metered charge, as the metered charge information.

Thus, control can be performed in which power usage of the facility equipment 200 of the consumer is suppressed on the basis of a fluctuation pattern of one day of the metered charge, and accordingly increase in load on the calculator for processing electricity charges can be suppressed.

Also, a system according to the present disclosure includes a control device 100 serving as a generating device that generates control information for controlling facility equipment 200 of a consumer that purchases power from an electricity retailer, and facility equipment 200 that accepts the control information generated by the control device 100 and performs action. The control device 100 includes an information acquisition unit 110 that acquires purchase price information, which is information relating to a purchase unit price of power that the electricity retailer purchases at a predetermined increment of time and that also acquires metered charge information, which is information relating to a unit price of a metered charge of power that the electricity retailer sells at the predetermined increment of time, and a control information generating unit 130 that generates control information for controlling the facility equipment 200 of the consumer by using the purchase price information and the metered charge information.

Thus, facility equipment 200 of the consumer can be controlled on the basis of a relation between the purchase unit price of power by the electricity retailer and the metered charge, whereby increase in load on a calculator for processing electricity charges can be suppressed.

Also, a program according to the present disclosure causes a computer to function as purchase price information acquisition section that acquires purchase price information, which is information relating to a purchase unit price of power that an electricity retailer purchases at a predetermined increment of time, metered charge information acquisition section that acquires metered charge information, which is information relating to a unit price of a metered charge of power that the electricity retailer sells at the predetermined increment of time, and control information generating section that generates control information for controlling facility equipment 200 of a consumer by using the purchase price information and the metered charge information.

According to the computer in which this program is installed, facility equipment 200 of the consumer can be controlled on the basis of a relation between the purchase unit price of power by the electricity retailer and the metered charge, whereby increase in load on a calculator for processing electricity charges can be suppressed.

REFERENCE SIGNS LIST

100 control device
110 information acquisition unit
120 storage unit
130 control information generating unit
140 output unit
200 facility equipment
210 accepting unit
220 action control unit
230 output unit
300 server
310 storage unit
320 transmission unit

The invention claimed is:

1. A generating device that generates control information for controlling facility equipment of a consumer that purchases power from an electricity retailer, the generating device comprising:
a purchase price information acquisition unit that acquires purchase price information, which is information relating to a purchase unit price of power that the electricity retailer purchases at a predetermined increment of time;
a metered charge information acquisition unit that acquires metered charge information, which is information relating to a unit price of a metered charge of power that the electricity retailer sells at the predetermined increment of time; and
a control information generating unit that generates control information for controlling the facility equipment of the consumer by using the purchase price information and the metered charge information,
wherein the generating device transmits the control information to the facility equipment, the facility equipment including a controller that controls actions by a mechanism or device in the facility equipment on the basis of the control information, and
wherein the generating device generates the control information, and controls the facility equipment to suppress consumption of the power by the facility equipment at an interval during which the purchase unit price is higher than a price determined based on the metered charge.

2. The generating device according to claim 1, wherein the control information generating unit generates the control information for controlling the facility equipment to suppress power usage, in a case in which the purchase unit price is higher than the metered charge.

3. The generating device according to claim 1, wherein the control information generating unit generates the control information for controlling the facility equipment to suppress power usage, in a case in which the purchase unit price is higher than a price determined based on a threshold value set for a difference between the purchase unit price and the unit price of the metered charge.

4. The generating device according to claim 1, wherein the control information generating unit generates the control information for controlling the facility equipment to suppress power usage, in a case in which the purchase unit price is higher than a price determined based on a threshold value smaller than 1 that is set for a ratio of the purchase unit price to the unit price of the metered charge at the predetermined increment of time.

5. The generating device according to any one of claims 1, 2, 3, and 4, wherein the metered charge information acquisition unit further acquires information representing a fluctuation pattern of one day of the metered charge, as the metered charge information.

6. A system, comprising:
a generating device that generates control information for controlling facility equipment of a consumer that purchases power from an electricity retailer; and
facility equipment that accepts the control information generated by the generating device and performs action,
wherein the generating device including
a purchase price information acquisition unit that acquires purchase price information, which is information relating to a purchase unit price of power that the electricity retailer purchases at a predetermined increment of time,
a metered charge information acquisition unit that acquires metered charge information, which is information relating to a unit price of a metered charge of power that the electricity retailer sells at the predetermined increment of time, and
a control information generating unit that generates control information for controlling the facility equipment of the consumer by using the purchase price information and the metered charge information,
wherein the generating device transmits the control information to the facility equipment, and the facility equipment includes a controller that controls actions by mechanism or device in the facility equipment on the basis of the control information, wherein the generating device generates the control information, and controls the facility equipment to suppress consumption of the power by the facility equipment at an interval during which the purchase unit price is higher than a price determined based on the metered charge.

7. A non-transitory computer readable medium on which is stored a program that, when executed, causes a computer to function as:

purchase price information acquisition section that acquires purchase price information, which is information relating to a purchase unit price of power that an electricity retailer purchases at a predetermined increment of time;

metered charge information acquisition section that acquires metered charge information, which is information relating to a unit price of a metered charge of power that the electricity retailer sells at the predetermined increment of time;

control information generating section that generates control information for controlling facility equipment of a consumer by using the purchase price information and the metered charge information; and transmission section that transmits the control information to the facility equipment, the facility equipment including a controller that controls actions by mechanism or device in the facility equipment on the basis of the control information, wherein the control information is generated, and the facility equipment is controlled to suppress consumption of the power by the facility equipment at an interval during which the purchase unit price is higher than a price determined based on the metered charge.

* * * * *